United States Patent [19]
Edgar

[11] Patent Number: 5,452,048
[45] Date of Patent: Sep. 19, 1995

[54] MIDDLE CURTAIN FLASH

[75] Inventor: Albert D. Edgar, Austin, Tex.

[73] Assignee: International Business Machines Corporation, Armonk, N.Y.

[21] Appl. No.: 183,643

[22] Filed: Jan. 19, 1994

Related U.S. Application Data

[63] Continuation of Ser. No. 925,461, Aug. 4, 1992, abandoned.

[51] Int. Cl.$^6$ .............................................. G03B 15/03
[52] U.S. Cl. .................................... 354/414; 354/137
[58] Field of Search ......................... 354/414, 137, 138

[56] References Cited

U.S. PATENT DOCUMENTS

| | | | |
|---|---|---|---|
| 4,079,389 | 3/1978 | Hashimoto et al. | 354/137 X |
| 4,317,624 | 3/1982 | Shenk . | |
| 4,351,594 | 9/1982 | Ishida et al. . | |
| 4,422,743 | 12/1983 | Izumi et al. | 354/415 |
| 4,491,404 | 1/1985 | Hasegawa et al. | 354/416 |
| 4,509,845 | 4/1985 | Mizokami | 354/420 |
| 4,514,074 | 4/1985 | Mizokami | 354/416 |
| 4,558,939 | 12/1985 | Taniguchi et al. | 354/416 |
| 4,592,639 | 6/1986 | Nakamura | 354/416 |
| 4,801,984 | 1/1989 | Woodall | 357/16 |
| 4,805,037 | 2/1989 | Noble et al. | 354/76 X |
| 4,812,872 | 3/1989 | Desormeaux | 354/414 |
| 4,878,081 | 10/1989 | Kishida et al. | 354/414 |
| 4,959,676 | 9/1990 | Matsuda et al. | 354/414 X |
| 5,055,865 | 10/1991 | Fujino et al. | 354/132 X |

FOREIGN PATENT DOCUMENTS

| | | |
|---|---|---|
| 280511 | 8/1988 | European Pat. Off. . |
| 2090424 | 7/1982 | Germany . |
| 3417436 | 11/1985 | Germany . |

*Primary Examiner*—W. B. Perkey
*Attorney, Agent, or Firm*—Jeffrey S. LaBaw

[57] ABSTRACT

A camera system and method for operation of fill flash photography, combining natural and flash light, which centers the times of natural light and flash light images. Synchronization is achieved by centering the time a flash is triggered midway between the opening front curtain and closing rear curtain of the shutter. In a particular preferred embodiment, a digital camera is coupled to a computer forming a system which stores images for image processing. The system includes a means for determining a period during which the shutter of the camera system will be opened and a means to determine a middle period in the the open shutter period. Preferably, the flash is fired at the midway point of the shutter period. This midway point in time is used to trigger the flash so it is substantially centered in time within the shutter period.

6 Claims, 8 Drawing Sheets

THE INVENTION

MIDDLE CURTAIN FLASH

This is a continuation of application Ser. No. 07/925,461 filed Aug. 4, 1992, now abandoned.

BACKGROUND OF THE INVENTION

This invention relates generally to electronic flash photography. More particularly, it relates to a method and means for improving fill flash photography by synchronizing an electronic flash to a shutter to improve the effective camera sensitivity.

When flash bulbs replaced flash powder, the flash bulbs were fired electrically in synchronization with the camera shutter. As the chemical reaction of the magnesium in the flash bulbs took a period of time, the firing of the flash was initiated before the shutter opened and a slight delay was built into the shutter between the time flash contact on the shutter shorted and the shutter opened. This latency time varied between different bulbs, but was finally standardized as the "M" sync speed. With the advent of electronic flash there was no latency, so a new "X" sync speed was added that waits to fire the flash until the shutter is opened fully. In conventional photography, the shorting of the contact which initiates the flash happens at the leading edge as the shutter first comes fully opened. After the flash fires, the shutter stays open for however long it is set thus continuing to buildup natural light exposure on the film.

There is a problem, however, with the "X" sync, or any short delay period which fires the flash near the beginning of the period when the shutter is opened. For moving objects, as the natural light exposure is much longer than the flash exposure, it continues building after the flash exposure giving streaks in the direction of motion. This effect is opposite from the normal decay process of the eye. As reflected in cartoon drawings, human vision perceives streaks trailing moving objects. To solve this problem, some new cameras, such as the Nikon 8008s in conjunction with the Nikon SB-24 flash, introduced "rear curtain" synchronization. The name comes from two curtains that form a focal plane shutter. Conventional flash photography can be termed "front curtain" synchronization as the flash fires when the front curtain first comes fully open. In "rear curtain" synchronization, the flash fires as the final or rear curtain falls at the end of the exposure interval. Other than multiple flash stroboscopic systems, to the applicant's knowledge, all synchronized flash systems to date fire the flash at either the beginning or the end of an exposure interval.

While the rear curtain synchronization represents an advance in the state of the art of photography, to a great extent we are still in the dark ages of photography. Most amateur photographers cannot take pictures in the natural light of life. Most amateur photographs look cold and stark, as though Thor threw a lightning bolt 3 inches above the camera. For both front and rear curtain flash, almost all pictures are ruined aesthetically by a heavy use of a camera flash, although in dim natural light, the flash often makes the difference between salvaging a record and having no image at all. While too much flash degrades the film image, it is also true that most photographs in dim light are improved with a little flash to fill in the dark shadows. However, mixing flash with natural light will entail leaving the shutter open for a relatively lengthy period of time which for moving objects will cause the blurred images discussed above.

In fill flash photography, the present invention reduces the perceived blurring of the natural light exposure relative to the flash light, thereby either improving the aesthetics of the image by reducing the blurring of the images of moving objects, or allowing a longer exposure time with the same blurring to reach further into dim natural light.

SUMMARY OF THE INVENTION

It is therefore an object of this invention to improve camera sensitivity for fill flash photography.

It is another object of the invention to reduce blurring of moving objects of fill flash photography for a constant flash power as that used in conventional photography.

It is another object of the invention to reduce the flash power required for flash fill photography.

It is another object to reduce the proportion of flash light to natural light to produce a more aesthetically pleasing image at equivalent blurring to conventional fill flash photography.

It is another object of the invention to reduce the power consumption of the flash at the same blurring as conventional fill flash photography.

These objects and others are accomplished by centering the natural light and flash light images, i.e., centering the flash impulse between the front and rear curtains of the shutter.

The invention will have application in any camera system using fill flash photography, but it finds particular application in a digital camera coupled to a computer system. The computer system captures the image sensed by the digital camera and stores the image for future image processing. Also, the computer system may control many of the functions of the digital camera such as shutter and flash timing as well as provide power for the camera.

In a camera system using the invention, a means for determining first time period during which the shutter of the camera system will be opened is required. Further, a means to determine a second time period which will occur in the middle of the first time period is needed. Both of these calculations can be performed by an exposure calculator modified for the present invention. Once the time periods are calculated they are loaded into one or more timers to control the shutter and flash. The second time period is used to center the flash within the first or opened shutter period.

The invention finds application in flash fill photography, not normal flash photography where the image is exposed by all flash light, nor outdoor photography where the image is formed by all natural light. Flash fill photography uses a mixture of natural light and flash light to expose the film in a camera.

BRIEF DESCRIPTION OF THE DRAWINGS

These objects and features will be more easily understood with reference to the attached drawings.

DETAILED DESCRIPTION OF THE DRAWINGS

Figure 1:
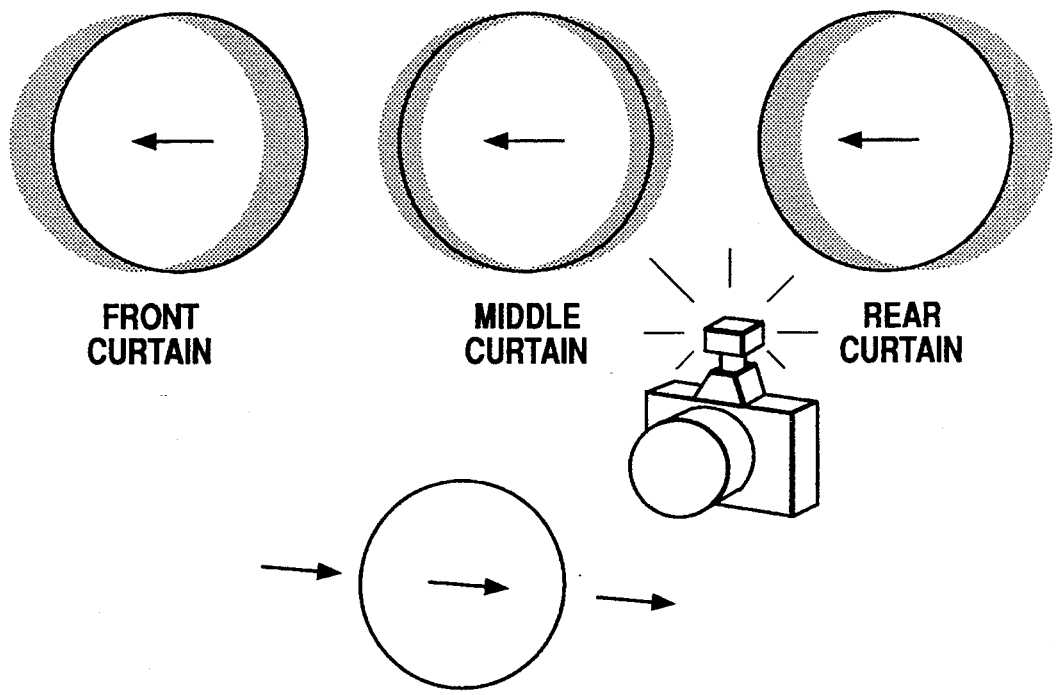
FIG. 1 depicts a moving hoop in front of a flash camera using front curtain, middle curtain and rear curtain flash synchronization.

FIG. 1 illustrates a hoop passing in front of a flash camera which utilizes fill flash photography. For purposes of illustration, the camera shutter remains open for approximately 1 second. At the left, the illustration shows the effect of firing the flash at the opening of the front curtain. Notice that the image shows streaking in the direction of motion in front of the primary flash image. At the right, the illustration depicts rear curtain flash synchronization, where the streaks of motion appear behind the primary flash image. Finally, in the middle of the illustration, middle curtain flash synchronization is depicted which shows some streaks both in front and behind the primary flash image. As shown, all three methods of flash synchronization introduce some blurring to the object.

Figure 2:
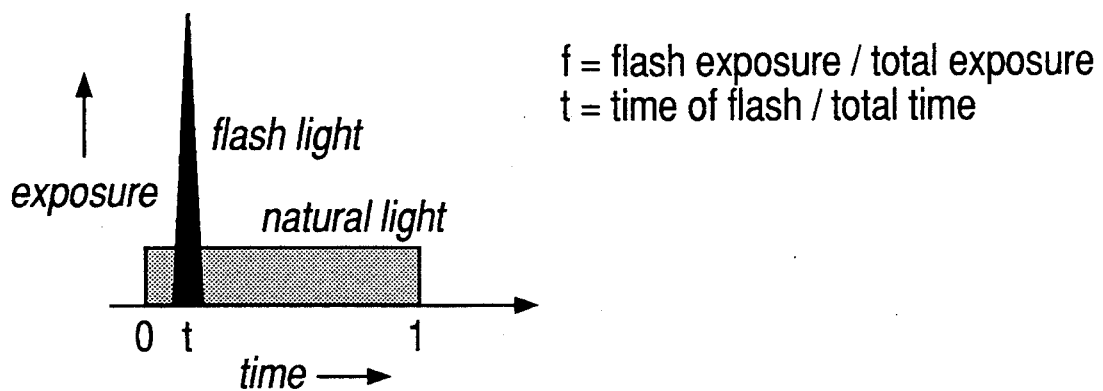
FIG. 2 is an illustration of the timing of flash light to natural light in a flash fill photography.
Figure 3:
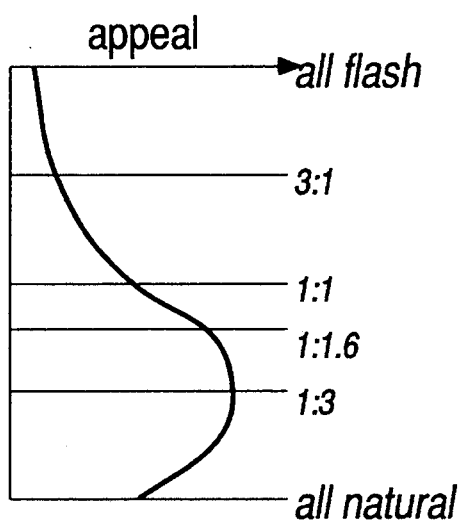
FIG. 3 depicts aesthetic appeal versus flash ratio and normalized sigma blurring at selected flash ratios where shutter time is kept constant at front curtain, middle curtain and rear curtain flash synchronization.
Figure 3:
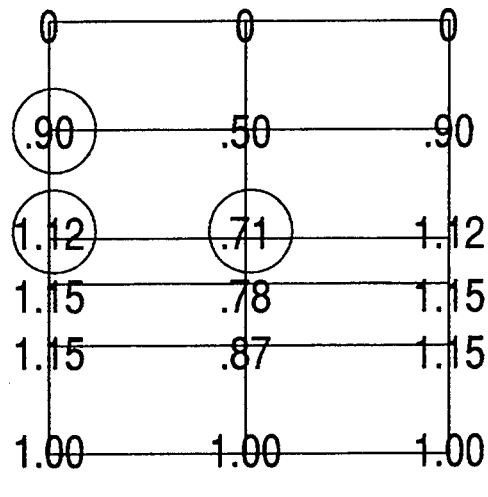
Figure 3:
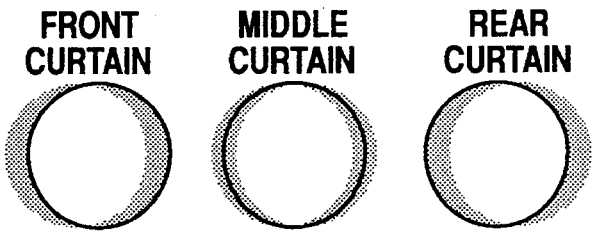
Figure 4:
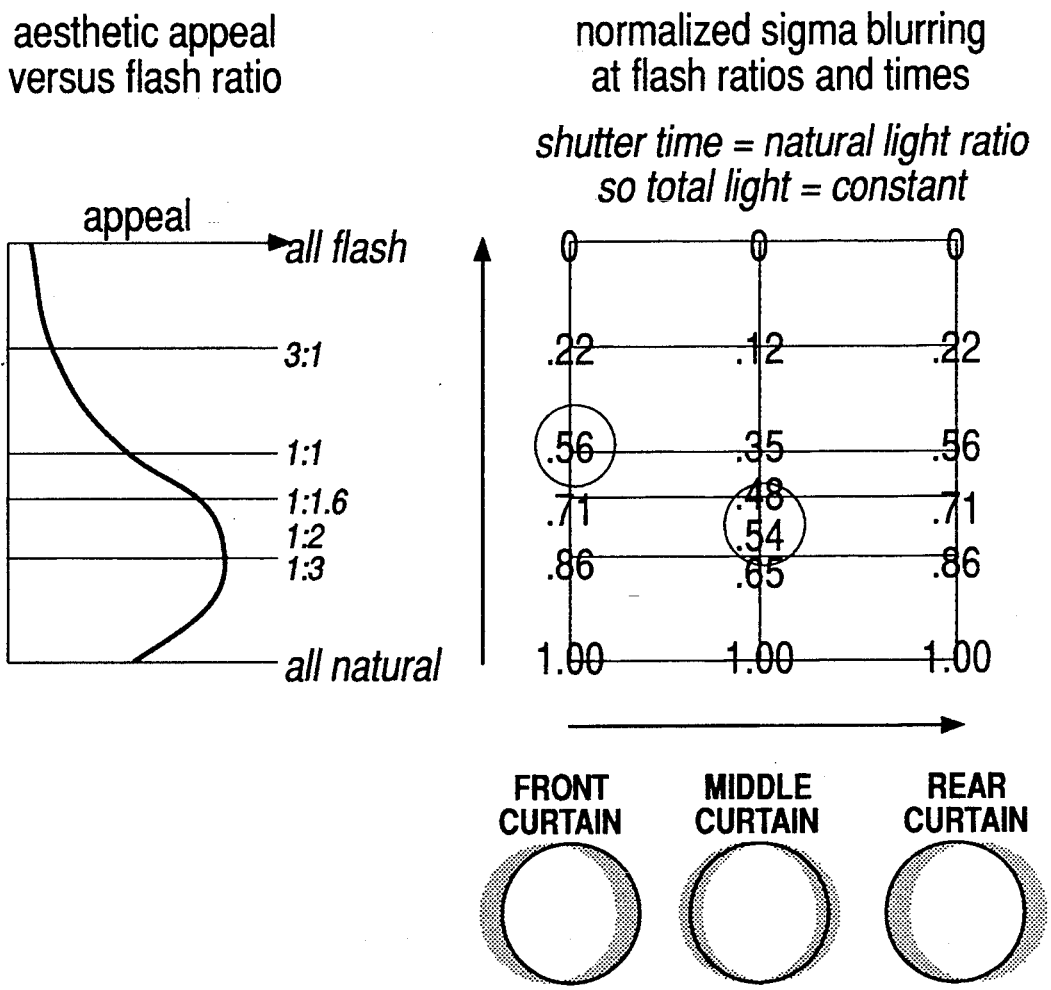
FIG. 4 illustrates aesthetic appeal versus flash ratio and normalized sigma blurring at selected flash ratios where total light is kept a constant for front curtain, middle curtain and rear curtain flash synchronization.

FIG. 2 illustrates the light in a flash fill photographic image. The natural light is constant between the time the front curtain opens and the rear curtain closes. The figure represents natural light exposure at a given film position in a focal plane flash. The block of natural light exposure shifts back and forth a little depending on the film position in the focal plane. In a leaf shutter flash, there is some of feathering of the natural light due to the time it takes to open and close the shutter, but it is only of a significant magnitude at large apertures. Flash light, on the other hand, rapidly increases from zero, has a peak at time t and rapidly decays to zero. Given a constant shutter speed and hoop velocity, when comparing front curtain, middle curtain and rear curtain flash synchronization modes, the amount of blurring will depend on the ratio of flash to natural light and the time the flash fires t. The amount of visual blurring is quantizable mathematically as the root-mean-square (RMS) blurring and is given by the equation in FIG. 2. This is the standard deviation with respect to time of the flash and the sum of the flash and natural light reaching the film. As the results in FIGS. 3 and 4 illustrate, middle curtain flash synchronization creates substantially less blurring than either front curtain or rear curtain flash synchronization modes. The mathematics confirms that the least blurring occurs when the flash and natural light components of the image are concentric, i.e., when the flash fires in the middle of the natural light exposure.

FIG. 3 uses the normalized sigma equation in FIG. 2 to compare the RMS blurring for different flash times on the horizontal axis, at front curtain rear curtain and middle curtain flash synchronization times, and for different ratios of natural to flash light on the vertical axis. In this figure, a constant shutter speed for all flash ratios is assumed. With a constant shutter speed a constant amount of natural light will expose the film. The blurring for all natural light is normalized to 1.00, and of course, the blurring for all flash light is assumed to be 0.00. Also, depicted is a graphic depicting aesthetic appeal versus the flash ratio, showing that all flash is relatively unappealing to most viewers when the flash is from an on-camera source while all natural light is more appealing. Some flash, e.g., a 1:3 flash light to natural light ratio, is usually most appealing with most subjects as it fills in the shadows in the subject without dominating the natural light effect.

With standard front curtain flash, doubling the total light by adding as much flash as natural light, i.e., a 1:1 ratio, actually makes the blurring worse by 1.12 versus 1.00 for no flash. The 1:1 ratio with middle curtain flash reduces the blurring to 0.71. As blurring is inversely proportional to shutter speed, when using middle curtain flash synchronization, instead of front or rear curtain flash, the shutter could be left opened $1.12/0.71=1.58$ times as long with no increase in effective blurring. Thus, middle curtain flash, by allowing a 50% longer exposure than standard flash is equivalent to boosting film speed by 50% with no increase in graininess. As film sensitivity has been doubling about every 10 years, the invention of middle curtain flash is equivalent to advancing film technology by 6 years for fill flash images.

The present invention also allows the use of less flash for equivalent blurring, as shown with reference to FIG. 4, thus not only saving battery power, but also improving the aesthetic quality of images. In the previous example, the advantages of the invention were traded to allow photography in dimmer light. In this example, the advantages are traded for better flash aesthetics and less flash power consumption.

FIG. 4 differs from FIG. 3 in that FIG. 3 assumes a constant shutter speed, whereas, FIG. 4 assumes constant light to the film. In FIG. 4, as the ratio of flash light to natural lights increases, the shutter time to natural light decreases to keep the total light to the film constant. As shutter time decreases, so does blurring in proportion. The numbers in FIG. 4 reflect the equivalent numbers in FIG. 3 multiplied by the percent of natural light determined by the flash ratio. Like FIG. 3, FIG. 4 shows different flash times on the horizontal axis and different ratios of natural to flash light on the vertical axis. Assuming constant sensor, or film speed, the use of this invention gives an aesthetically pleasing 1:2 flash-to-natural light ratio with a normalized sigma blurring of 0.54. Yet this 1:2 flash ratio with middle curtain flash actually causes slightly less blurring than using the front curtain flash synchronization method with a harsher ratio of 1:1 which degrades the image aesthetics and requires 50% more flash power. Especially in a small camera system operating off battery power in a host computer, this saving of flash power can significantly reduce flash cost and weight and increase battery life.

Figure 5A:
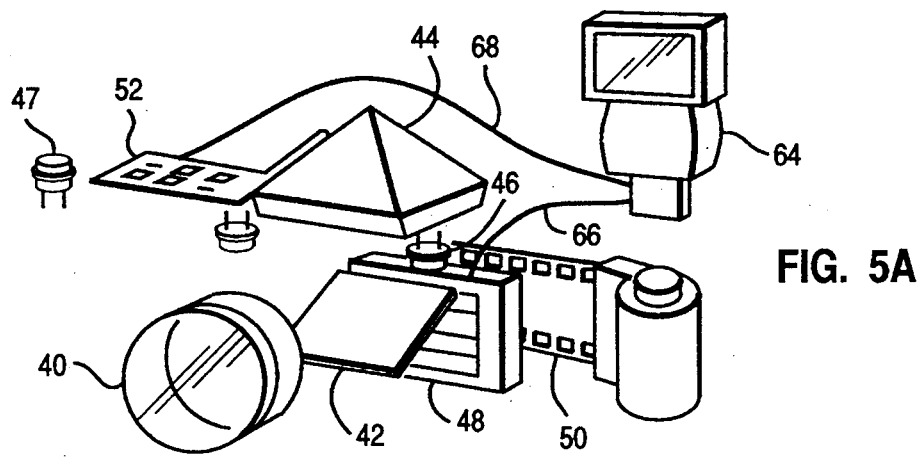
FIGS. 5A and 5B show a modern film camera modified to practice the present invention in an exploded, perspective view and a block diagram respectively.
Figure 5B:
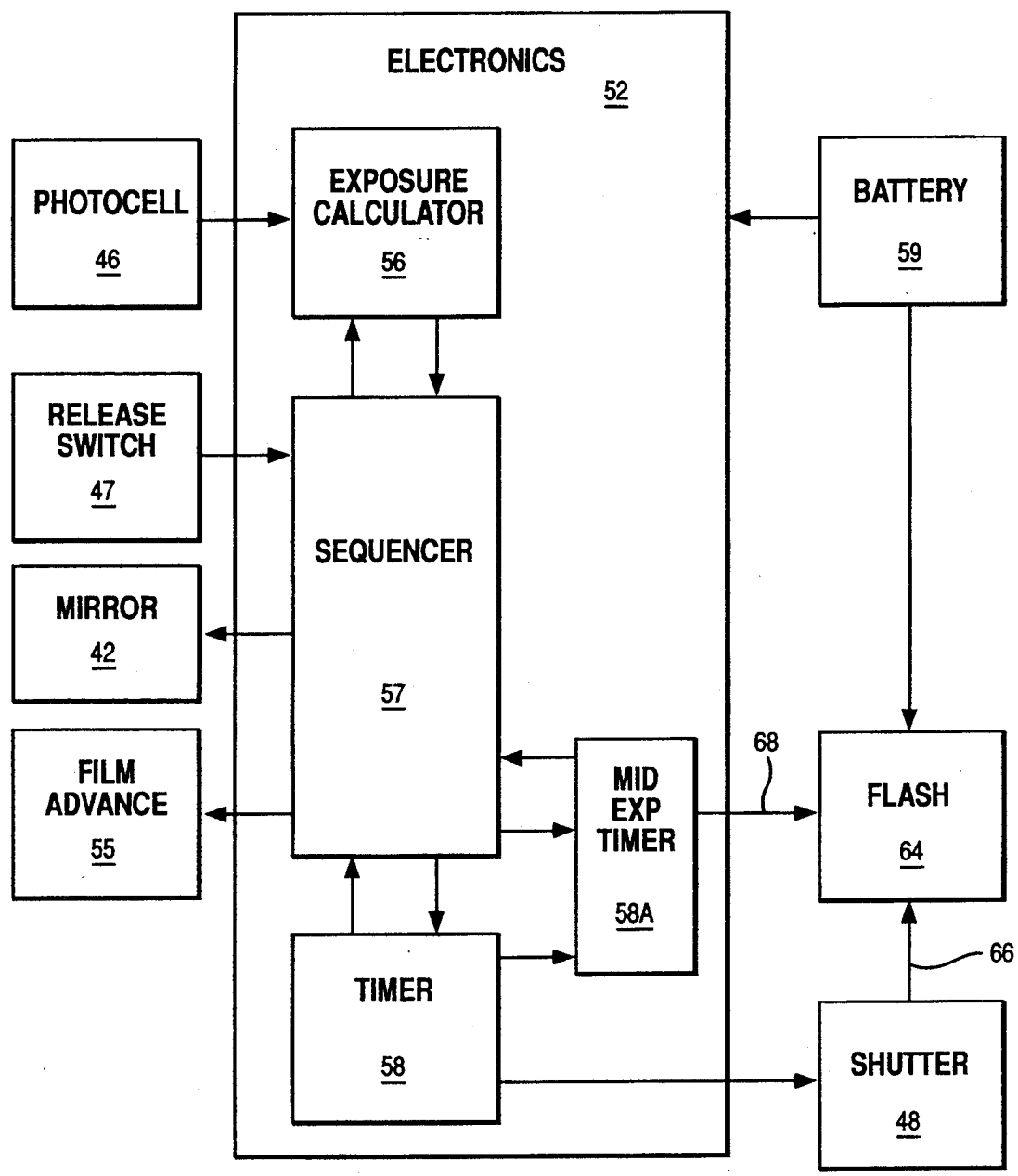

Key components of a modern film camera are shown in FIGS. 5a and 5b in an exploded, perspective view and block diagram form respectively. A lens 40 receives light that moveable mirror 42 normally deflects to a prism 44 through which a viewer selects an image. Also receiving the same light are two photocells 46. When the photographer depresses a release button 47, the electronics 52 measure the light through photocells 46 to calculate an exposure time, send electrical signals to retract mirror 42, and open shutter 48 to expose film 50. In a conventional camera, the opening shutter 48 mechanically closes contacts to trigger a flash 64 through a cable 66. The electronics 52 also time the shutter 48, and send electrical signals to close the shutter 48 when a precalculated count is satisfied. Once the shutter 48 is closed, the electronics 52 send control signals to wind the film 50 to a new exposure.

In FIG. 5b the electronic elements of the camera in FIG. 5a are described in greater detail. Once the trigger signal from shutter release 47 is received by the electronics 52, it is passed through a sequencer 57. The sequencer 57 makes sure that the camera operations take place in the proper order. First, the sequencer 57 calls on an exposure calculator 56 to read illumination through photocell 46 and return a correct exposure length. In the present invention, the calculator 56 may also calculate a flash delay period which is used to fire the flash midway between the front and rear curtains of the flash 64. Next, the sequencer 57 raises the mirror 42 by controlling a motor (not pictured) and loads the exposure length into a timer 58 and flash delay period in a midexposure timer 58A. In the diagram, the timer 58 used for controlling the shutter 48 and the midexposure timer used for controlling the flash 64 are broken out as separate entities, although in fact both function may be accomplished by a single timer. The timer 58 opens shutter 48, and closes it when the exposure length has been recorded. The midexposure timer 58A notes the open shutter signal and begins timing the flash delay period, firing the flash 64 once the flash delay period has expired. After the shutter 48 is closed, the timer 58 signals shutter closure to the sequencer 57, which lowers the mirror 42 and advances the film through a motor 55. Batteries 59 provide power to the camera electronics 52 and the flash 64.

In a conventional camera, the flash 64 is normally fired through connection 66 by an electrical contact in the shutter mechanism 48 that closes due to the mechanical motion of the shutter. In the present invention, the flash 64 would preferably be fired directly by the midexposure timer 58A through connection 68.

Obviously, many variations are possible, for example, mechanical cameras are still manufactured, so this illustration represents only a typical camera.

Figure 6A:
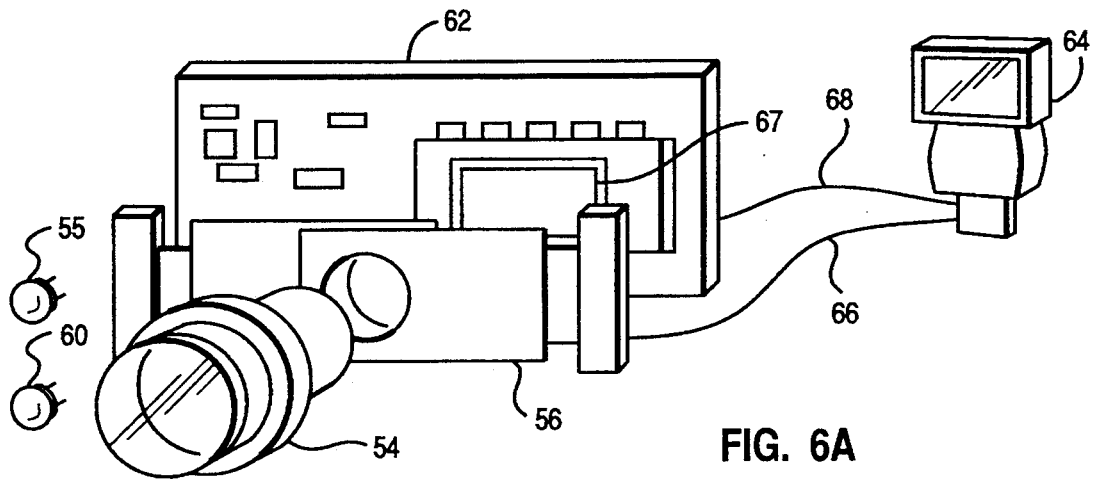
FIGS. 6A and 6B show a digital film camera modified to practice the present invention in an exploded, perspective view and a block diagram respectively.
Figure 6B:
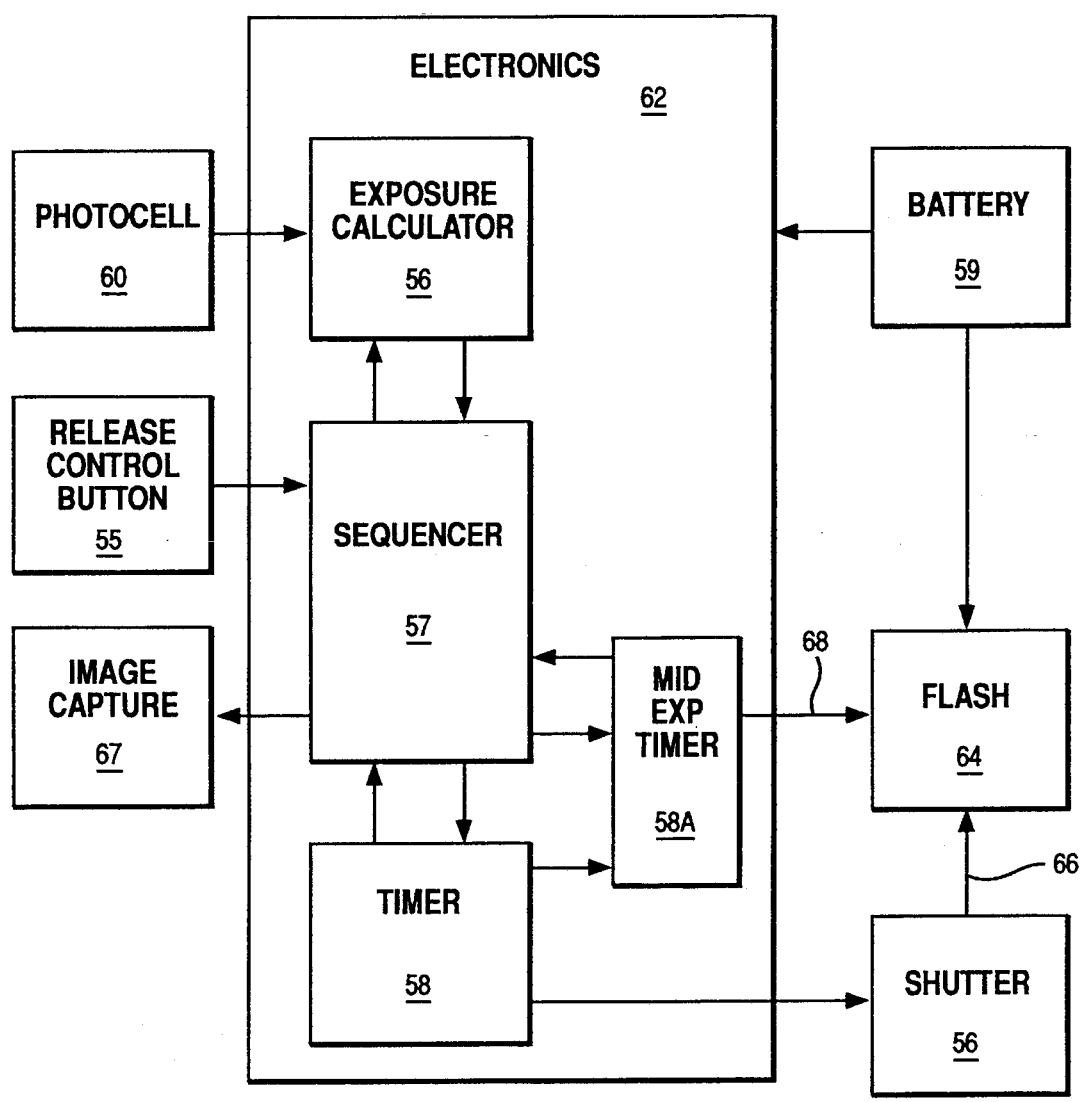

The key components of an electronic camera are similar as shown in FIGS. 6a and 6b. A lens 54 receives light. When the photographer depresses a release button 55, the electronics 62 begin an exposure sequence. Especially in an electronic camera, the release button 55 may be replaced by a trigger command from an attached computer system. The electronics 62 measure the light through a photocell 60 to calculate an exposure time sending the necessary signals to clear a solid state sensor array 67, then open shutter 56 to expose the solid state array 68. The opening shutter 56 mechanically closes contacts to trigger a flash 64 through a cable 66. The electronics 62 also time the shutter 56, sending the control signals to close it when a precalculated count is satisfied. Once the shutter 56 is closed, the electronics 62 shift out the image from array 68 into an analog to digital controller and receiving digital memory. Some digital sensors use an electronic shutter, for example, video cameras. These sensors are more expensive per pixel.

FIG. 6b portrays, in block form, the key elements of the electronic camera in FIG. 6a. Most elements are equivalent to those for a film camera discussed previously with reference to FIG. 5b, and are not repeated. There are several differences. The mirror is not needed in most electronic cameras if the sensor can act as its own viewfinder. Note, however, that some electronic cameras still use an optical viewfinder. The shutter 48 is still needed in most electronic cameras, although some that use a lower resolution video array with separated shifters do not require the mechanical shutter. Since no film is used, none of the attendant film advance mechanisms are required.

The operation of the invention will be described below for either the film camera or electronic camera of FIGS. 5a, 5b, 6a and 6b with reference to a specific preferred method.

Figure 7A:
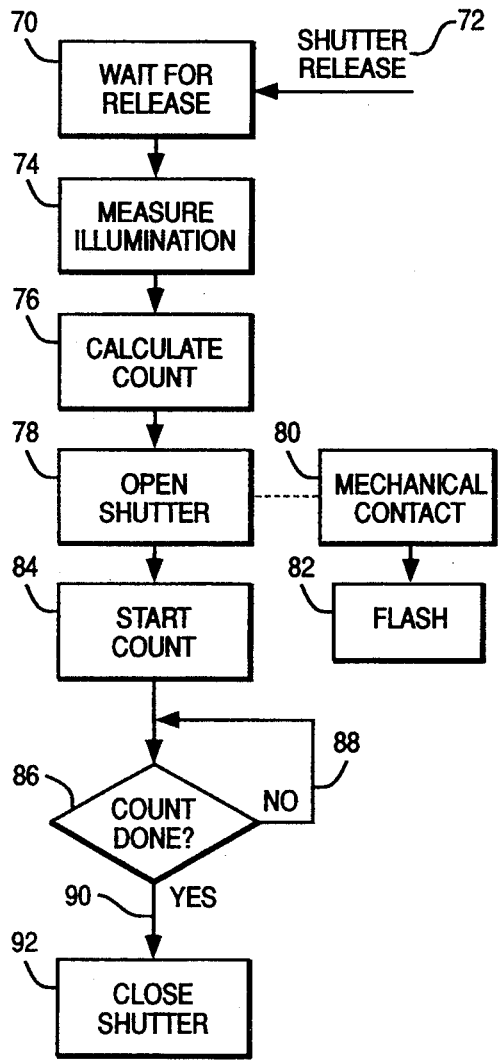
FIG. 7A is a flow diagram of a prior art method controlling the flash in response to a shutter release command.

First, however, a typical prior art flow chart in FIG. 7a is discussed for reference. The camera is initially in a ready state 70 waiting for an external shutter release command 72. Upon receiving this command, the camera measures the illumination 74 and based on the light and other settings, such as film speed and lens aperture, calculates an appropriate exposure time count 76, and commands the shutter to open 78. The mechanical opening of the shutter closes a mechanical contact 80 delayed by the mechanical time it takes for the shutter to open. This contact sends an electrical signal to fire the flash 82. Meanwhile, an electronic counter has been started 84. The count is continually compared to the calculated count 86. If not sufficient, branch 88 continues the count. When the count is satisfied, branch 90 is taken to close the shutter 92.

Figure 7B:
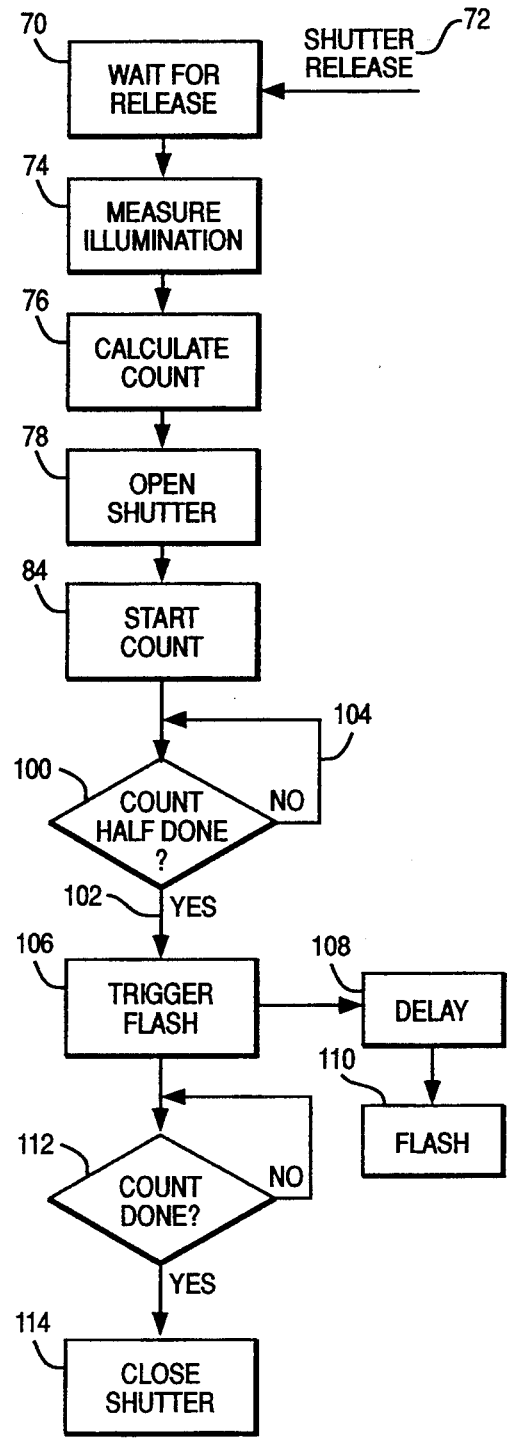
FIG. 7B is a flow diagram of one method of providing middle curtain flash in accordance with the invention.

Now the invention is described with reference to FIG. 7b. As in the prior art, there is a ready state 70 waiting for a shutter's release 72. Upon receiving this command, the illumination is measured 74, a count is calculated 76, the shutter opened 78, and the count started 84. A test is made for the halfway point in the count 100. When the count is half done 102, the flash is triggered 106. The trigger passes a delay 108, which could be by a second counter functionally combined with the halfway counter 100, or by other means. The delay is equal to the mechanical delay for the shutter to open or close. This is so that the trigger-flash command, which is electronically centered between the open and close shutter commands, will ultimately activate the flash 110 at a time functionally centered between the mechanical opening and closing of the shutter. Finally, as in the prior art, the count is tested for completion 112, and when finished, the shutter is closed 114.

In the most preferred embodiment of the invention, the flash is centered exactly midway between the front and rear curtain as this is time when the effect will be greatest. However, those skilled in the art would recognize that a significant portion of the benefit of the invention could be realized if the flash fired anytime during the middle ⅓ to middle ¼ of the period during which the shutter is opened. Therefore, for the purposes of the invention, a flash should be considered to fire midway during the open shutter period if it fires any time during the middle ⅓ of the open shutter period.

Figure 8:
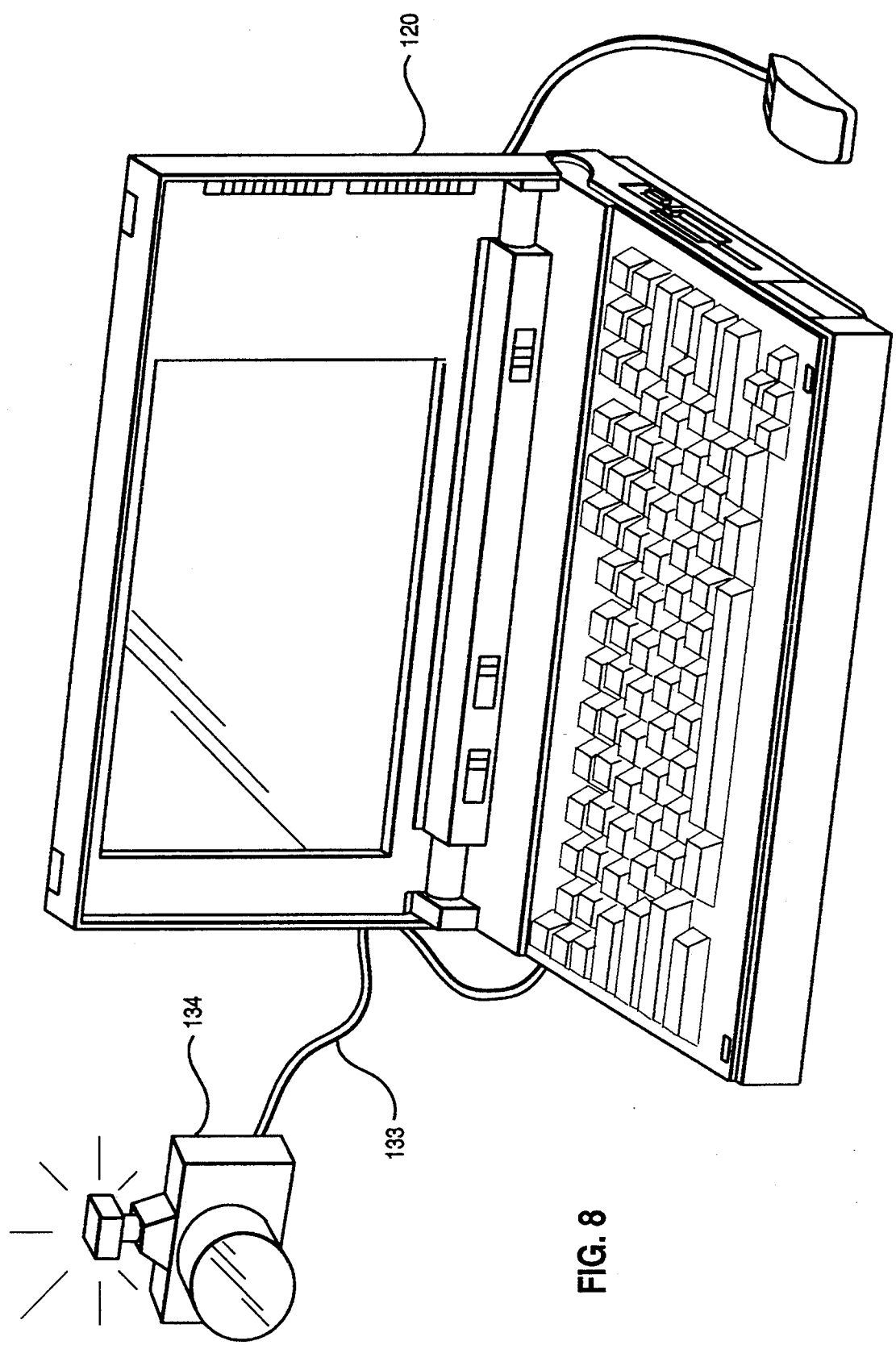
FIG. 8 is an illustration of a digital camera and computer system which performs fill flash photography in accordance with the present invention.

FIG. 8 depicts a particularly preferred embodiment of the present invention in which a computer 120 system image capture and processing capabilities is coupled by means of a tether 133 to a digital camera 134 which uses middle curtain flash when fill flash photography is selected by the user. In such a system, the digital camera 134 is controlled by software stored in the computer 120 which affects such parameters as shutter opening, flash timing, and shutter closing. The cost of modifying a digital camera for the present invention is a small programming cost.

Figure 9:
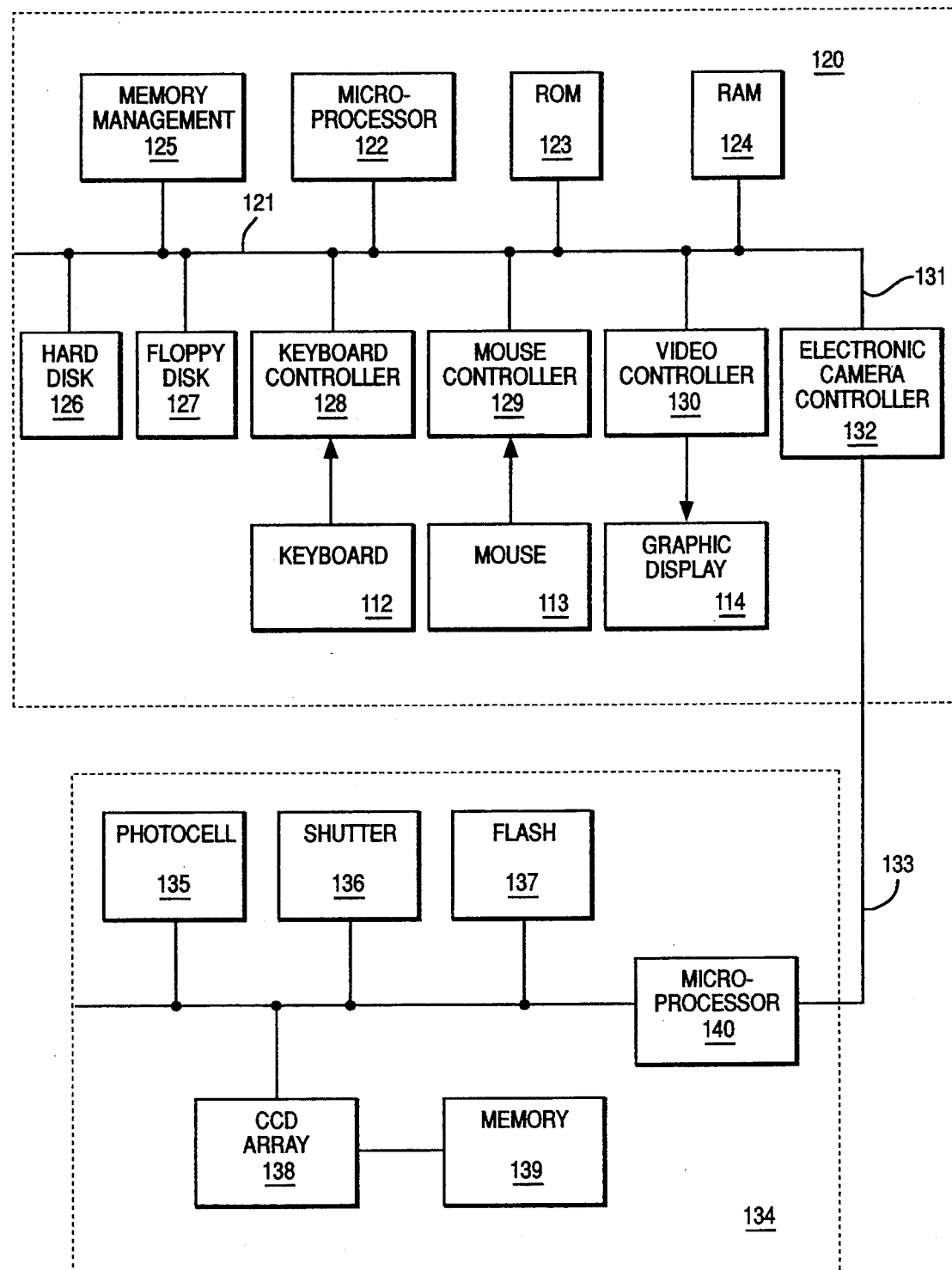
FIG. 9 depicts the functional blocks of a particularly preferred embodiment.

FIG. 9 depicts the functional blocks of this particularly preferred embodiment. The system 120 includes a system bus 121 to which various components are coupled and by which communication between the various components is accomplished. A microprocessor 122 is connected to the system bus 121 and is supported by read only memory (ROM) 123 and random access memory (RAM) 124 also connected to system bus 121. The microprocessor 122 is preferably one of the Intel family of microprocessors including the 8088, 286, 386 or 486 or 586 microprocessors. However, other microprocessors including, but not limited to Motorola's family of microprocessors such as the 68000, 68020 or the 68030 microprocessors and various Reduced Instruction Set Computer (RISC) microprocessors manufactured by IBM, Hewlett Packard, Sun, Motorola and other may be used in the specific computer.

The ROM 123 contains among other code the Basic Input/Output System (BIOS) which controls basic hardware operations such as the interactions of the disk drives and the keyboard. The RAM 124 is the main memory into which the operating system and multimedia application programs are loaded. The memory management chip 125 is connected to the system bus 121 and controls direct memory access operations including, passing data between the RAM 124 and a hard disk drive 121 and floppy disk drive 127. A CD ROM 128, also coupled to the system bus 121, is used to store the large amount of data present in a multimedia program or presentation.

Also connected to this system bus 121 are three I/O controllers: the keyboard controller 129, the mouse controller 130 and the video controller 131. As might be expected, the keyboard controller provides the hardware interface for the keyboard 112, the mouse controller 113 and the video controller 114. Lastly, an electronic camera controller card 132 is coupled to the system bus 121 to provide control of the capture device.

The logic inside the computer controls the camera 134 via a bus 131 in the electronic camera controller card 132. This controller 132 could be in a PC MCIA card, to which the camera 134 is attached via a tether 133. Inside the camera, a microprocessor 140 exerts control over the camera resources including the charge coupled device (CCD) array 138, a shutter 136 and a flash 134. In the preferred embodiment, the microprocessor 140 passes controls to the camera resources to the computer via tether 133, controller 132 and computer bus 131. These controls include triggering an exposure, triggering the flash and reading the resulting image from memory 139 into the computer memory 124. Thus, either the computer processor 122 reading the appropriate sets of instructions in memory 124 or the camera microprocessor 140 could provide the exposure and flash delay period calculations as well as the timing functions described above to practice middle curtain flash.

As the power demands from the flash are reduced, product cost and size would shrink slightly and the battery life of the computer to which the camera is tethered and drains its power would increase, particularly as a flash is normally very power hungry and most electronic cameras scenarios predict more pictures made for choice of images than with a film based system. A 50% boost in imaging speed or reduction in flash power is not dramatic, but it is noticeable and nontrivial. Applicant estimates that roughly an order of magnitude improvement in quantum detection is needed to open the world of professional natural light photography to the mass market. This jump is unlikely to be made in a single invention, but it is attainable with a combination of six improvements of similar magnitude to this invention.

While the invention has been described respective particular embodiments above, it would be understood by those skilled in the art that modifications may be made without parting from the spirit and scope of the present invention. These embodiments are for purposes and example and illustration only and are not to be taken to limit the scope of the invention narrower than the scope of the appended claims.

I claim:

1. In a camera system, a method of timing an electronic flash during a fill flash mode comprising the steps of:

determining a time period during which a shutter of the camera system will be open;

determining a flash fire time substantially midway in the time period for all light conditions; and in response to beginning the time period, firing the electronic flash at the determined flash fire time in the time period.

2. The method as recited in claim 1 wherein the flash is fired exactly halfway during the time period.

3. A camera system having a flash fill mode comprising:

a means for determining a time period during which a shutter of the camera system will be open;

a means for determining a flash fire time substantially midway in the time period for firing an electronic flash for all light conditions in the flash fill mode; and, a timer for controlling the shutter and firing the flash at the flash fire time in response to a signal that the time period has begun.

4. The system as recited in claim 3 wherein the flash is fired exactly halfway during the first time period.

5. A digital camera system having a flash fill mode controlled by a computer system comprising:

a digital camera;

a computer coupled to the digital camera having a processor, a memory and an input device;

a means for determining a time period during which a shutter of the camera system will be open;

a means for determining a flash fire time substantially midway in the time period for firing electronic flash for all light conditions in the flash fill mode; and, a timer to control the shutter and the flash in response to a signal that the time has begun.

6. The system as recited in claim 5 wherein the flash is fired exactly halfway during the first time period.

* * * * *

UNITED STATES PATENT AND TRADEMARK OFFICE
CERTIFICATE OF CORRECTION

PATENT NO. : 5,452,048
DATED : September 19, 1995
INVENTOR(S) : Aldbert D. Edgar It is certified that error appears in the above-indentified patent and that said Letters Patent is hereby corrected as shown below:

Col. 5, line 3, delete "68" and insert --57--.

Signed and Sealed this

Thirtieth Day of July, 1996

Attest:

BRUCE LEHMAN

Attesting Officer

Commissioner of Patents and Trademarks